Figure 3:
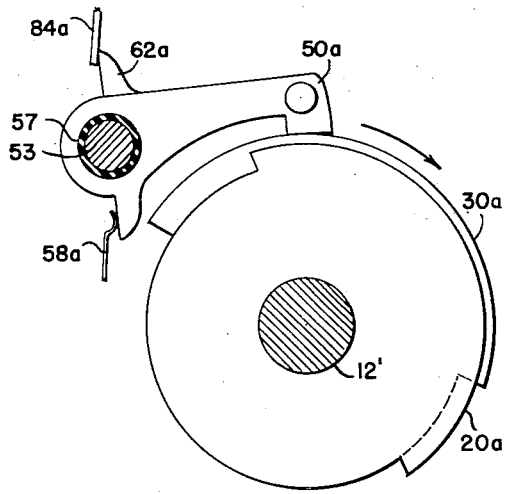

April 1, 1952      H. F. ELLIOTT      2,591,413
APPARATUS FOR POSITIONING A ROTARY CONTROLLED ELEMENT
Filed Sept. 19, 1947      7 Sheets-Sheet 1
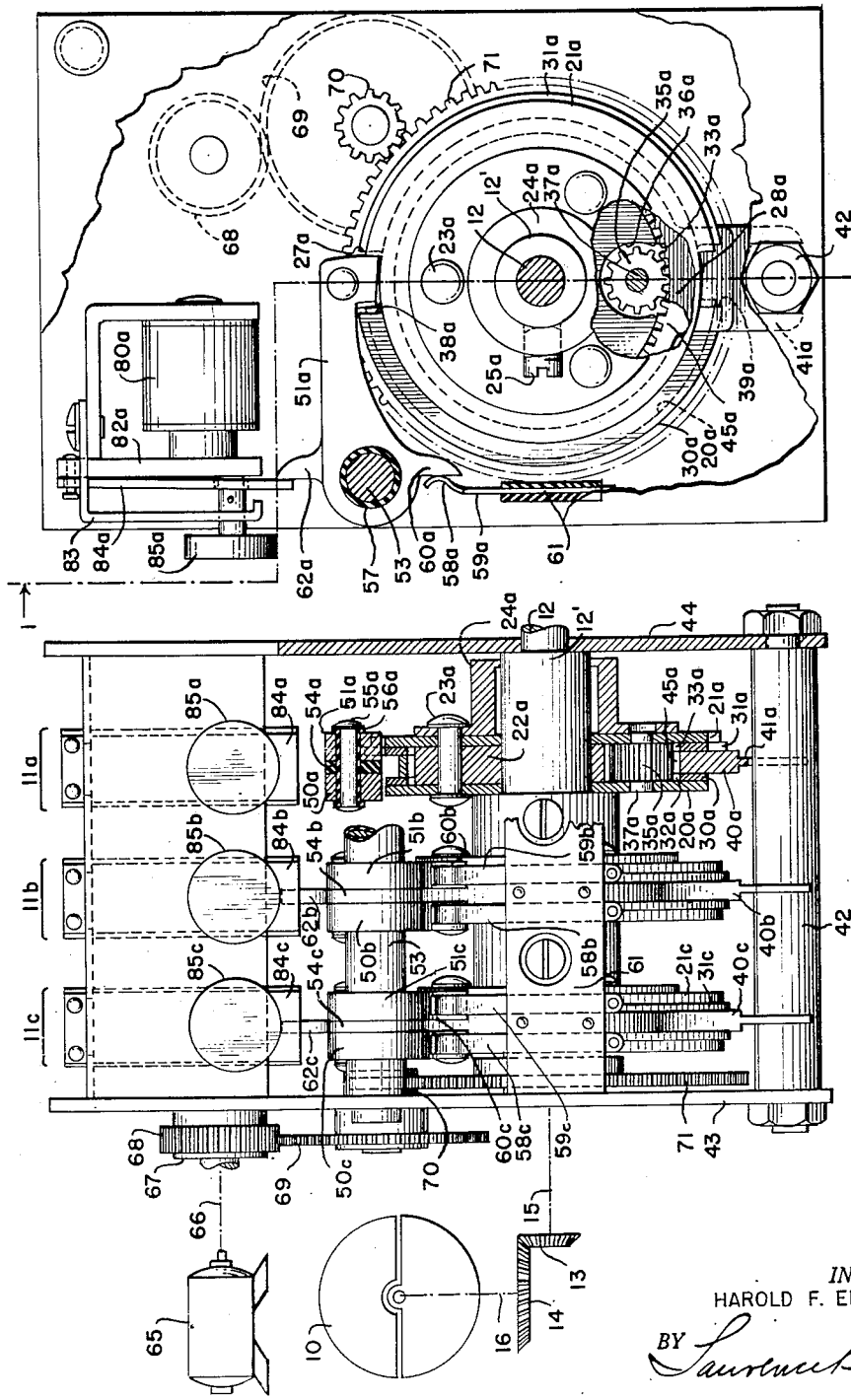
INVENTOR.
HAROLD F. ELLIOTT
BY
ATTORNEY April 1, 1952   H. F. ELLIOTT   2,591,413
APPARATUS FOR POSITIONING A ROTARY CONTROLLED ELEMENT
Filed Sept. 19, 1947   7 Sheets-Sheet 2

*INVENTOR.*
HAROLD F. ELLIOTT
BY Laurence P. Dodds
ATTORNEY

April 1, 1952 H. F. ELLIOTT 2,591,413
APPARATUS FOR POSITIONING A ROTARY CONTROLLED ELEMENT
Filed Sept. 19, 1947 7 Sheets-Sheet 3
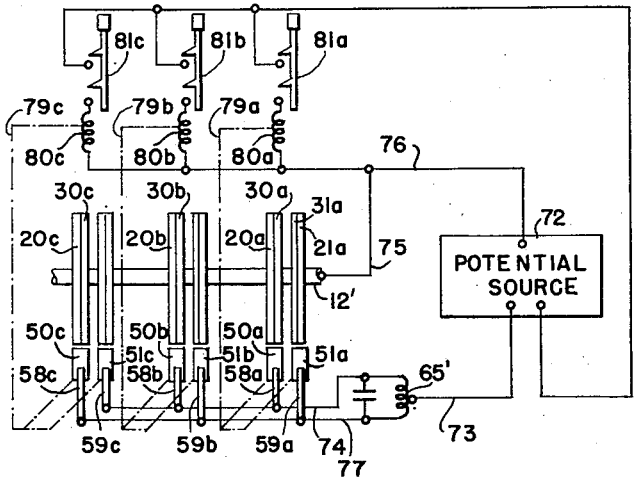
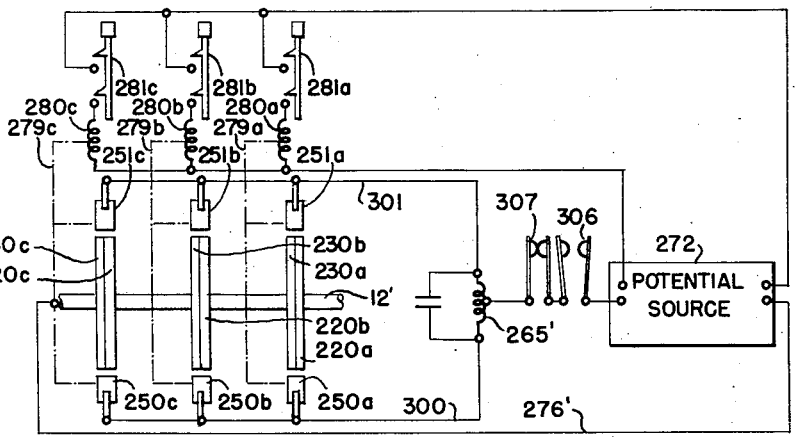
INVENTOR.
HAROLD F. ELLIOTT
BY
ATTORNEY

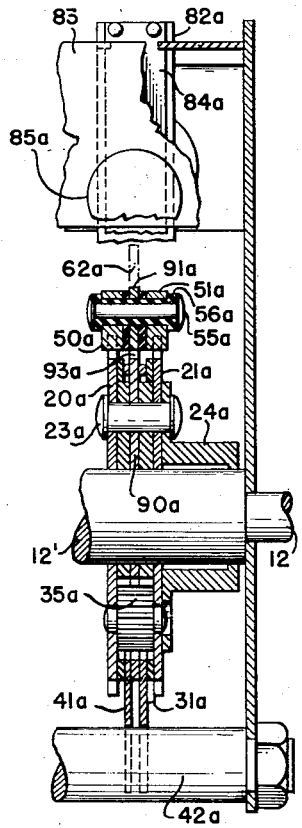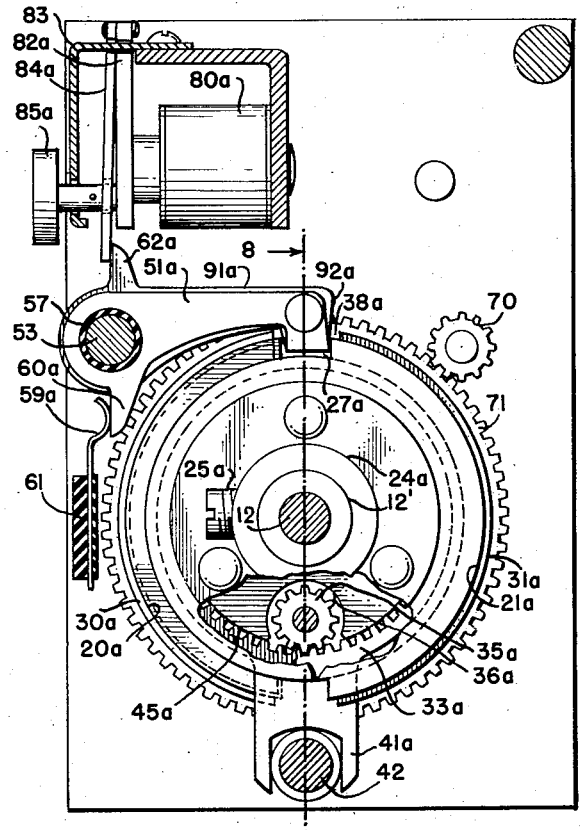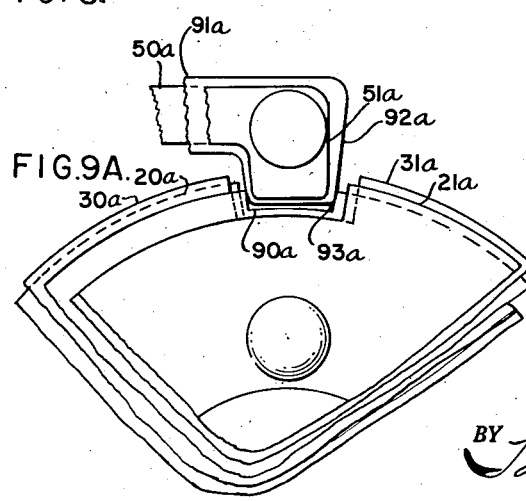

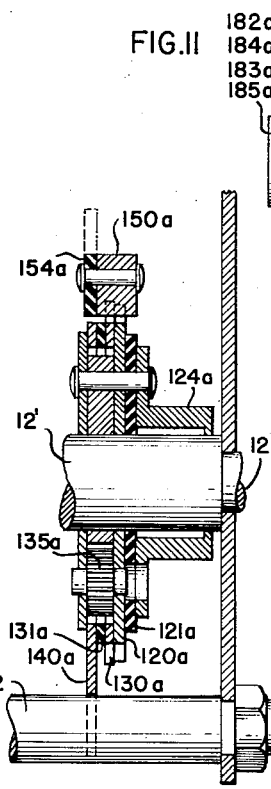
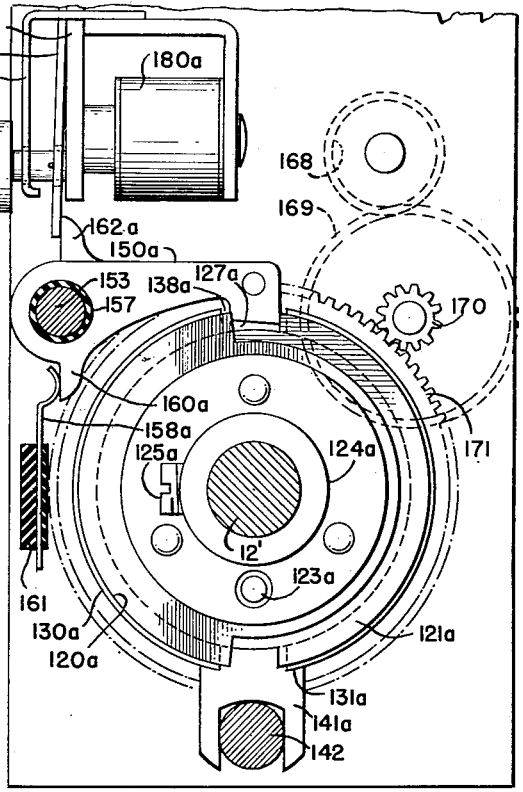
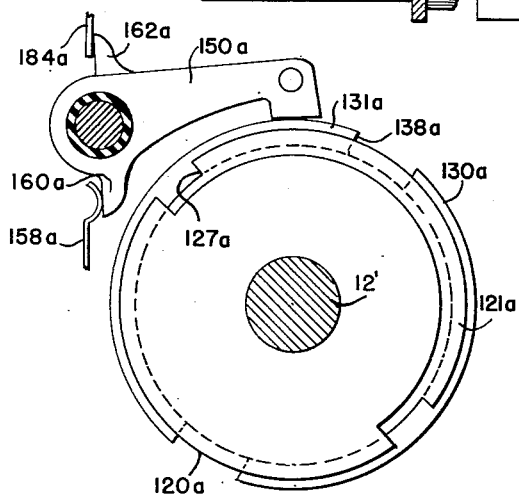
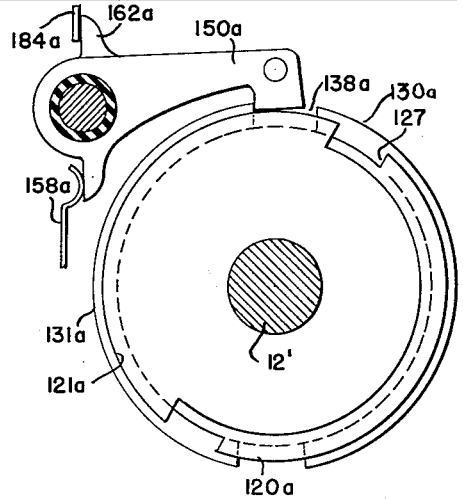
FIG.13   FIG.14
INVENTOR.
HAROLD F. ELLIOTT April 1, 1952     H. F. ELLIOTT     2,591,413
APPARATUS FOR POSITIONING A ROTARY CONTROLLED ELEMENT
Filed Sept. 19, 1947     7 Sheets-Sheet 6

INVENTOR.
HAROLD F. ELLIOTT
BY Lawrence B. Dodds
ATTORNEY

April 1, 1952 H. F. ELLIOTT 2,591,413
APPARATUS FOR POSITIONING A ROTARY CONTROLLED ELEMENT
Filed Sept. 19, 1947 7 Sheets-Sheet 7

INVENTOR.
HAROLD F. ELLIOTT
BY Laurence B Dodds
ATTORNEY

Patented Apr. 1, 1952

2,591,413

UNITED STATES PATENT OFFICE 2,591,413

APPARATUS FOR POSITIONING A ROTARY CONTROLLED ELEMENT

Harold F. Elliott, Palo Alto, Calif.

Application September 19, 1947, Serial No. 775,026

27 Claims. (Cl. 192—142)

The present invention relates, in general, to apparatus for precisely positioning a rotary controlled element in a predetermined angular position and is especially directed to control apparatus of the so-called multi-revolution type. The expression "multi-revolution type" is used herein and in the appended claims to define a control apparatus including a rotary driving element effective to position a rotary controlled element in any selected one of a plurality of predetermined positions, any two of which may have an angular separation represented by rotation of the driving element exceeding one complete revolution.

The invention is subject to a wide range of applications and may be advantageously employed in connection with any electrical or mechanical system having a controlled element to be positioned in any one of several preselected settings to determine the operating characteristics of the system. For example, in the fields of radio, radar, television, and facsimile it is customary to determine the tuning or some other operating characteristic of the equipment through the use of a tuning element which may be selectively adjusted. For convenience, the invention will be described in detail in connection with the selective tuning of a wave-signal receiver.

A generally similar control apparatus for facilitating the tuning of a radio receiver to preassigned frequencies forms the subject of my co-pending application Serial No. 771,999, filed September 3, 1947, and entitled "Apparatus for Positioning a Rotary Controlled Element." The arrangement of that application is also of the multi-revolution type, comprising a fast member rotatable over a multi-revolution range and a slow member concurrently rotated with the fast member. Both of these members have stop provisions, usually stop recesses, formed on the external periphery and a stop device co-operates with the stop recesses of those members to effect preset tuning. In a simple form, the stop device rides on the slow member in the manner of a cam follower and, when it registers with the stop recess therein, it drops on to the periphery of the fast member once again to function analogously to a cam follower. The ultimate engagement of the stop device with the recess of the fast member locks the apparatus against further rotation and thereby determines the tuning of the controlled receiver.

Briefly, the described arrangement may be considered as one in which the slow member selects a particular revolution within the multi-revolution range of the fast member and the stop device arrests the apparatus at a selected point in that particular revolution precisely to adjust the tuning. Since it is usually desirable to have several preselected tuning conditions, the over-all apparatus includes a plurality of similar control units to each of which one tuning conditions is pre-assigned. In that case, the fast members of all units are driven each time a tuning adjustment is to be made and the stop devices are selectively actuated to ascertain which unit will effect the control during any given tuning operation.

As explained in my copending application, there is a tendency of apparatus of that type to enter into an undesired mode of operation when tuning the controlled receiver between two preselected frequencies which are relatively close to one another in the frequency spectrum. The undesired mode may result in inaccurate tuning of jamming of the control apparatus and is avoided by a special sequence control. The sequence control comprises an arrangement which establishes a specific direction of rotation so to orient the stop recess of the fast member relative to the stop device that only a prescribed sequence of operations can be initiated in tuning between two stations having a small frequency separation.

The present invention is an improvement of the apparatus described in the copending application, requiring no added sequence control device and yet avoiding tendencies toward jamming or undesired modes of operation when tuning between two stations to be received by the controlled receiver. The apparatus to be described also features direct homing, which means a selection of the direction of rotation of the fast and slow members in each controlled unit such that both members are driven to home positions in engagement with the co-operating stop device in the shortest possible time, that is, with the least angular displacement of those members.

It is an object of the present invention to provide a multi-revolution control apparatus which avoids the tendency of prior arrangements towards jamming or undesired modes of operation.

It is another object of the invention to provide a control apparatus of the multi-revolution type having a new and improved arrangement for controlling the operating sequence.

It is a further object of the invention to provide a control apparatus of the multi-revolution type having a new and improved arrangement for effecting direct homing of the controlling apparatus to realize accurate and swift adjustments of the controlled element.

It is a specific object of the invention to provide a control apparatus having an improved arrangement for ascertaining the direction of rotation to effect direct homing with a consequent rapid and precise adjustment of the controlled element.

In accordance with one feature of the present invention, apparatus for positioning a rotary controlled element in a predetermined angular position comprises at least one rotatable member including stop provisions. The apparatus also has a conductive stop device for registering with the stop provisions to arrest the rotatable member when that member is in a preselected angular position related to the aforesaid predetermined position of the controlled element. There is an electrical reversible system for concurrently driving the rotatable member and the controlled element, and control circuits are included in the electrical system. The control circuits include the conductive stop device and serve to determine the direction of rotation of the electrical system to effect direct homing of the rotatable member to its preselected angular position.

In accordance with another feature of the present invention, apparatus for positioning a rotary controlled element in a predetermined angular position comprises a fast member rotatable within a multi-revolution range and including at least one conductive sector less than 180 degrees. The apparatus also has a slow rotatable member including at least one conductive sector less than 180 degrees. Conductive sensing means are provided for engaging the slow member and movable, when the slow member is in a preselected angular position, into engagement with the fast member. There is an electrical, reversible system for driving the fast and slow members at a preselected speed ratio and control circuits are included in the electrical system. The control circuits comprise the sensing means and the conductive sectors of the rotatable members for determining the direction of rotation of the reversible system to effect direct homing of first the slow member to its preselected angular position and then the fast member to a preselected angular position related to the predetermined position of the controlled element. Finally, the apparatus has means for providing a driving connection from one of the rotatable members to the controlled element.

For a better understanding of the present invention, together with other and further objects thereof, reference is had to the following description taken in connection with the accompanying drawings, and its scope will be pointed out in the appended claims.

Figure 16:
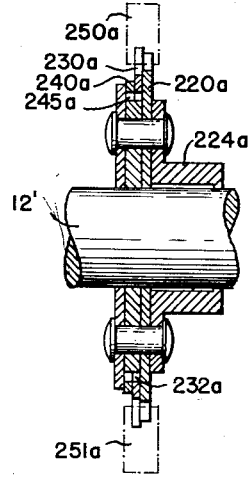
Figure 15:
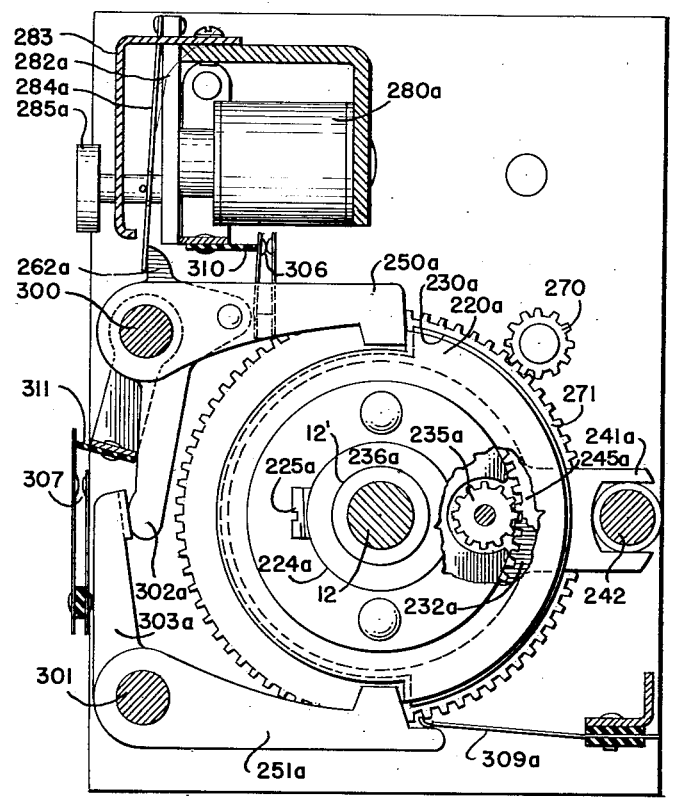
Figures 18, 19:
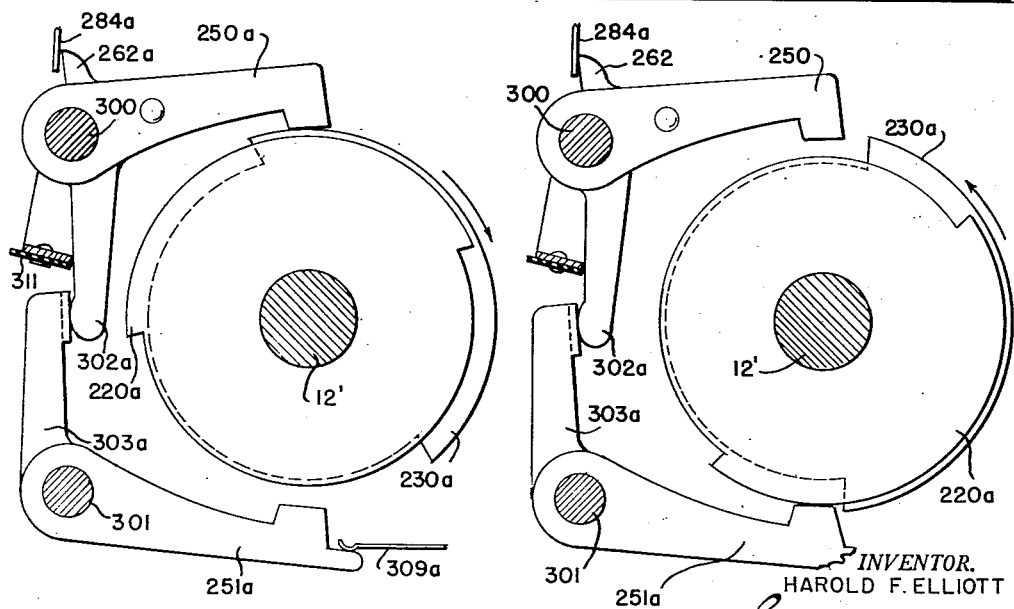
Figure 20:
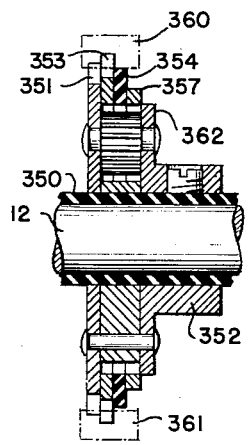
Figure 21:
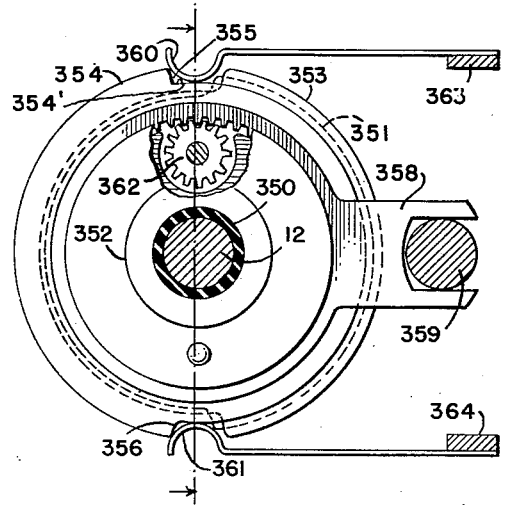
Figure 22:
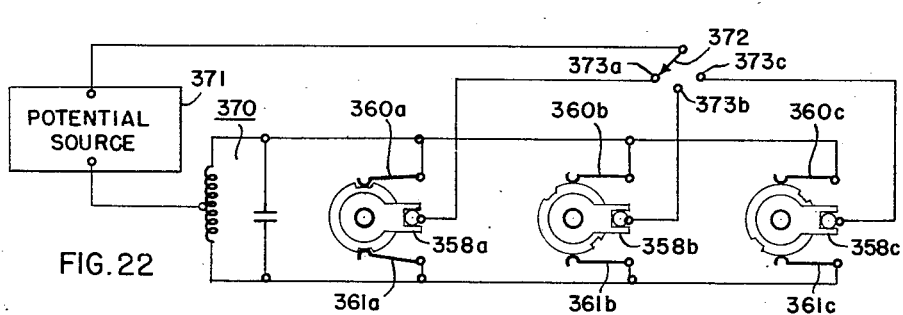
Figure 23:
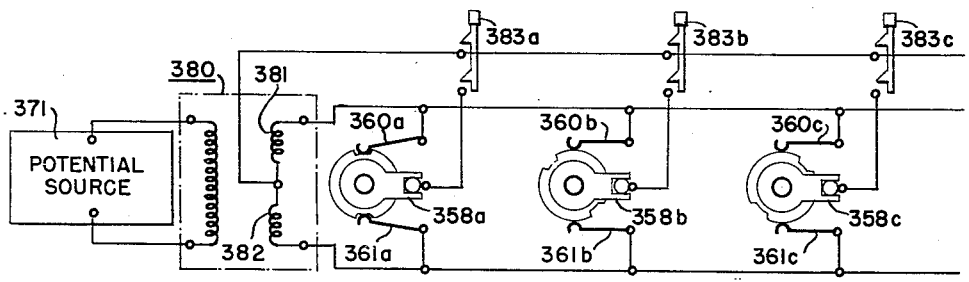

Referring now to the drawings, Figs. 1 and 2 are elevation and end views, respectively, partially broken away, of a control apparatus embodying the invention in one form; Figs. 3, 4, 5, and 6 are explanatory diagrams used in describing the operation of the arrangement of Figs. 1 and 2, while Fig. 7 is a schematic circuit diagram for that apparatus. Figs. 8 and 9 are elevation and end views, respectively, of a modified form of the apparatus of Figs. 1 and 2. In Figs. 10 and 11 there are represented elevation and end views, respectively, of another control apparatus including the invention in a different form, and Fig. 12 is a schematic diagram of a circuit suitable for that arrangement. Figs. 13 and 14 are explanatory views to aid in describing the operation of the apparatus of Figs. 10 and 11. End and cross-sectional views of a further embodiment of the invention are represented in Figs. 15 and 16, and a diagram of a control circuit therefor is included in Fig. 17. Figs. 18 and 19 are explanatory views used in discussing the operation of the embodiment of Figs. 15 and 16. A further embodiment is represented in Figs. 20 and 21 and control circuits therefor are represented in Figs. 22 and 23.

Referring now more particularly to Figs. 1 and 2, the arrangement there represented embodies one form of control apparatus in accordance with the present invention to effect tuning of a wave-signal receiver to any of a plurality of preselected frequencies. Inasmuch as the receiving system, per se, forms no part of the instant invention, only its tuning element 10 has been represented. This element has, for convenience, been shown as the usual air-dielectric condenser having a stator and co-operating rotor, although other adjustable devices, such as permeability tuners, adjustable lines, adjustable resonant cavities and the like, may be controlled equally well by the apparatus. It will be further understood that several tuning elements may be mechanically interconnected for uni-controlled adjustment by the apparatus to be described, where that is desired. In order to realize selective adjustment of the rotary controlled tuning element 10, as between several available predetermined settings, the apparatus comprises a plurality of control units mutually oriented so that each corresponds with an assigned one of the desired settings. The control units are designated 11a, 11b, and 11c in Fig. 1, but the number to be included is determined by the number of preset tuning conditions desired.

Each of these control units is adjustably fixed to an enlarged section 12' of a shaft 12 which is rotatable over a range of many revolutions. A gear train 13, 14 connects shaft 12 with the rotor of tuning element 10, as indicated schematically at 15 and 16, a suitable speed reduction being employed so that rotation of shaft 12 throughout its entire range effects only the desired total displacement of the rotor of the condenser, usually 180 degrees. By virtue of the connection of shaft 12 with the tuning element, each preselected angular position of the shaft determines and corresponds with a related tuning position of the condenser shaft and a selected operating frequency of the receiver including this condenser.

Figure 4:
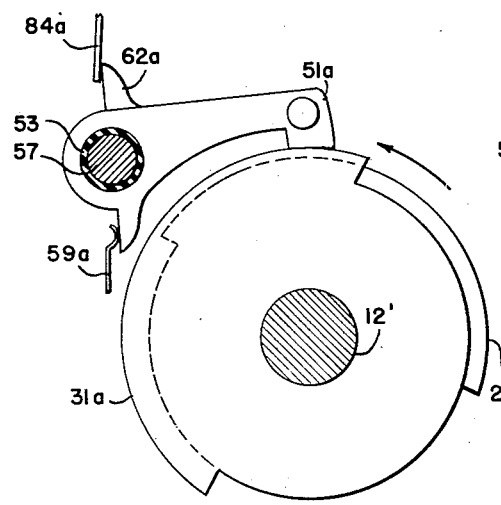

In describing the construction of the control units, reference will be made to the first unit 11a, but it will be understood that the description applies equally well to each of the remaining ones. Control unit 11a comprises a fast member rotatable within a multi-revolution range and including at least one conductive cam sector less than 180 degrees. For the specific embodiment, the fast member is composed of two similar conductive sectors 20a and 21a positioned on either side of a hub 22a. Rivets or shoulder screws 23a assemble these elments into one mechanism and include in that mechanism an additional hub 24a which may accommodate a set screw 25a, shown in Fig. 2, for adjustably securing the composite fast member to shaft section 12' for concurrent rotation therewith. Inasmuch as the shaft is rotatable within a multi-revolution range, the composite fast member is likewise rotatable over such a range. Figs. 3 and 4 are detail views to illustrate clearly the construction of the conductive discs 20a and 21a of the fast member assembly. Each disc is in the form of a cam, having a cam portion of increased radius and an arc length less than 180 degrees. They are assembled symmetrically or in mirror image relation effectively to provide recesses 27a and 28a, as shown in Fig. 2, between their adjacent end portions.

Additionally, control unit 11a has a slow rotatable member also including at least one conductive cam sector less than 180 degrees but, in the instant embodiment, having two such sectors. The first sector of the slow member is indicated at 30a and its companion member is designated 31a. Figs. 3 and 4 show clearly the nature of each sector, indicating that each has a cam portion less than 180 degrees. The cam sectors 30a and 31a are supported in mirror image relation, defining recesses 38a and 39a between their end portions as shown in Fig. 2 and their radius exceeds that of the cam sectors 20a and 21a of the fast member.

Both sectors 30a and 31a of the slow member are rotatably supported upon the hub 22a of the fast member assembly to be in coaxial alignment therewith. Each is provided with an internal gear designated in Fig. 1 as 32a for the sector 30a and 33a for the sector 31a. These gears are in constant meshing engagement with a pinion gear 35a received within a recess 36a of the hub 22a, as illustrated in Fig. 2. The pinion gear 35a is mounted on a stub shaft 37a which rotatably supports the pinion from sectors 20a and 21a of the fast-member assembly. Intermediate the sectors 30a and 31a of the slow member there is a stationary disk 40a having a bifurcated projection 41a, shown in Fig. 2, for engaging a rod 42 secured to frame members 43 and 44 and common to all of the control units. The stationary element 40a likewise has an internal gear, designated 45a in Fig. 1, engaging the pinion gear 35a. The gear portions 32a, 33a, 35a and 45a complete a hypocycloid type of planetary gear system interconnecting sectors 20a and 21a of the fast-member assembly, with sectors 30a and 31a of the slow-member assembly so that these assemblies are concurrently rotated at a selected speed ratio.

If the gears 32a and 33a of the slow member individually have sixty-five teeth while gear 45a of the stationary element has sixty-four teeth, sixty-five revolutions of the fast-member assembly are required to cause one complete revolution of the slow member. This is a suitable assignment of gears where the rotational range of shaft 12 is to be thirty revolutions and that of condenser 10, 180 degrees, with 60:1 reduction gearing at 13—14. The mechanical assembly of the sectors 20a and 21a of the fast member also serves to maintain the several gears of the hypocycloid system in proper operating relation relative to one another, and it is to be understood that the diameter of the gear of the stationary member 40a is selected to permit free rotation of the hub 22a therein.

Control unit 11a further includes conductive sensing means for engaging the cam sectors of the slow member and movable when the slow member is in a preselected angular position, hereafter referred to as "home position," into engagement with the cam sectors of the fast member. The sensing means is one integrated mechanical structure but includes two brushes shown in Fig. 1 at 50a and 51a. Brush 50a is positioned over conductive sector 20a of the fast member and conductive sector 30a of the slow member for registration therewith during the tuning operation. Brush 51a, on the other hand, overlies sector 21a of the fast member and sector 31a of the slow member, with which it is adapted to register.

As represented in Fig. 2, each brush is in the form of a bell crank and together they pivot on a rod 53 which is common to all of the control units. They are separated by a member 54a of approximately the same configuration but constructed of insulating material and they are interconnected mechanically at their free ends by a rivet 55a provided with an insulating sleeve 56a. It is also preferable that an insulating bushing 57 be associated with the bearing portion of the bell cranks so that they may be electrically insulated from one another. Springs 58a and 59a exert a counter-clockwise biasing force against projections 60a of the brushes, normally to bias those brushes in an inactive position wherein they are out of contact with the assemblies of both the fast and slow members. The brushes 50a and 51a function to determine, in conjunction with control circuits presently to be described, the direction of rotation of an electrical reversible system for driving the fast and slow members at their selected speed ratio.

The electrical system includes a motor 65, represented schematically in Fig. 1, having a driving connection designated by the broken line 66 through a slip clutch 67 and a gear train 69–71, inclusive, to the shaft 12. The electrical system additionally includes the control circuits, referred to previously, for determining the direction of rotation of motor 65 to effect direct homing of first the slow member 30a, 31a to a preselected position, and then the fast member 20a, 21a to a preselected angular or home position related to the predetermined position of the controlled condenser 10 assigned to the control unit 11a under consideration. The control circuits may be most readily traced in the schematic representation of Fig. 7 wherein the potential source is shown schematically at 72. A conductor 73 from one terminal of the source connects through one-half of a split-phase field winding 65' of the reversible motor 65 to a bus bar or conductor 74. A first control circuit may be selectively completed through spring 58a and brush 50a to one of the conductive sectors 20a and 30a, thence to shaft 12, returning to the opposite terminal of the potential source by way of conductors 75, 76. That circuit is selectively completed to establish a clockwise direction of rotation. A second control circuit may be completed from conductor 73 through the other half of the field winding 65' to a bus bar or conductor 77 and from that conductor through spring 59a and brush 51a to either of the conductive sectors 21a or 31a. From those conductive sectors the circuit extends through shaft 12 and conductors 75, 76 to the opposite side of source 72 and this latter circuit, when completed, establishes a counter-clockwise direction of rotation.

The broken construction line 79a indicates unicontrol or simultaneous operation of brushes 50a and 51a by an associated selector magnet 80a which may be energized by the selective actuation of a push button 81a.

Referring now to Fig. 1, it is seen that the series of springs 58a, 58b, 58c, and series 59a, 59b, 59c, are supported upon a structure 61 extending from the frame of the apparatus and constructed of insulating material so that the circuits of the individual springs are electrically isolated from one another. The magnet 80a appears in Fig. 2 and has an associated armature 82a which is pivoted upon a support 83. Where the exciting potential source 72 is an alternating-current source, a laminated spring 84a is included in the armature structure and extends into engagement with a projection 62a of the insulating member 54a positioned between brushes 50a and 51a. Also, for alternating current operation, shading rings (not shown) are preferably provided for the magnet. Another push button 85a slidably supported by frame member 83 engages the armature 82a through a clearance hole in spring 84a to permit manual operation of the control unit independently of its selector magnet 80a.

As previously pointed out, the several control units are identical in construction and the elements thus far recited having the reference character a are duplicated in each of the others. In order to avoid confusing the representation of Fig. 1, not all duplicating characters are associated with the remaining control units 11b and 11c.

In utilizing the described apparatus to position shaft 12 and, with it, controlled tuning condenser 10 into any of the several possible preselected positions, it will be understood that the fast and slow rotatable members of each control unit are initially oriented relative to the shaft to correspond with an assigned one of the selectable positions. The manner in which their orientation may be accomplished will be described hereinafter.

In explaining the operation of the apparatus automatically to adjust the turning of an associated receiver by its control of condenser 10, it will be assumed initially that the apparatus is completely at rest. For that condition, the springs 58 and 59 of each control unit, by exerting a counter-clockwise force against the depending projections 60 of the several brushes, cause all brushes to be completely out of engagement with the cam sectors of the fast and slow members of their respective control units. This rotation of the brushes simultaneously biases the armatures 82 of the corresponding selector magnets to a neutral position. Where the apparatus is to function to effect a turning operation, the push button 81 for a particular control unit is depressed, completing the energizing circuit for the appropriate selector magnet 80.

Assuming push button 81a to be actuated, selector magnet 80a is energized and attracts its armature 82a. The laminated spring 84a permits the armature 82a to be pulled tightly against the pole face of magnet 80a regardless of the orientation of the fast and slow members relative to their brushes 50a and 51a. With the armature attracted, spring 84a overcomes the force of springs 58a and 59a and rotates the brush assembly in a clockwise direction, presenting the brushes to the aligned sectors of the fast and slow members. Usually, the initial rotation of the brush assembly results in one of the four conditions represented by the explanatory Figures 3–6, inclusive.

In Fig. 3, brush 50a engages cam sector 30a of the slow member completing from its spring 58a, the brush itself, and cam sector 30a an energizing circuit for motor 65 which establishes a clockwise direction of rotation. Although brush 51a has a simultaneous and co-extensive displacement, that brush is not in contact with cam sector 31a of the slow member because of the mirror image relationship in which the sectors 30a and 31a of the slow member are arranged. It is held from reaching any conductive sector of the fast member by the engagement of brush 50a with sector 30a of the slow member. Consequently, shaft 12 is driven by the motor and concurrently drives the rotor of tuning condenser 10 on one hand and both the fast and slow members through the planetary gear system 32a, 33a, 35a and 45a. The slow member rotates at one-sixty-fifth of the speed of the fast member and the direction of rotation remains unchanged, driving the slow cam sector 30a to the home position shown in Fig. 5.

When the slow member reaches its home position, brush 50a rides off the trailing edge of cam sector 30a into the recess 38a separating sectors 30a and 31a of the slow member. At that time the laminated spring 84a is free to effect further rotation of the brush assembly in a clockwise direction. If this added displacement of the brush assembly occurs with the cam sectors in the relationship shown in Fig. 5, brush 50a registers with the cam sector 20a of the fast member which continues the same energizing circuit for motor 65 so that the direction of rotation is unchanged. As the fast member is driven to its home position, the brush 50a rides off the trailing edge of the cam 20a and the brush assembly enters the stop recess 27a which is effectively defined by the adjacent edges of cam sectors 20a and 21a of the fast member.

The registration of the brush assembly with stop recess 27a locks the assemblies of both the fast and slow members against further rotation and effectively interrupts the driving connection between motor 65 and shaft 12 and the rotor of condenser 10, this interruption being permitted by the slip clutch 67 which allows the motor to spin to a stall. At that time, the assemblies of both the fast and slow members are in their home positions, the driving operation is arrested, and the adjustment of the tuning condenser is complete. The apparatus is shown in Fig. 2 in its home position with the brush assembly functioning as a stop device engaging stop recess 27a of the fast member, and 38a of the slow member. In this manner, the control unit 11a is effective to drive the rotor of controlled condenser 10 to a predetermined angular position related to the home positions of the assemblies of the fast and slow members and thus establish a predetermined tuning condition for the associated receiver.

Figure 6:
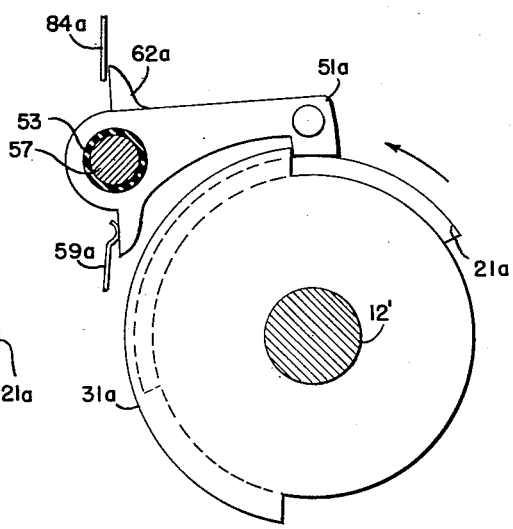

Assuming the initial orientation of the assemblies of the fast and slow members to be as indicated in Fig. 4, the clockwise rotation of the brushes resulting from the energization of magnet 80a causes brush 51a to engage the cam sector 31a of the slow member completing, through spring 59a, the brush 51a, and the cam sector 31a, an energizing circuit for motor 65 which establishes a counter-clockwise direction of rotation. As the slow member arrives at its home position and cam sector 31a is driven beyond its associated brush 51a, that brush may fall to the periphery of cam sector 21a of the fast member, as represented in Fig. 6, continuing the same energizing circuit for the motor and the same direction of rotation. When sector 21a of the fast member arrives at its home position, the relationships of Fig. 2 are again established, that is, both the fast and slow members have arrived at their home positions, the driving system has been effectively interrupted, and the rotor of the condenser displaced to establish the condition of tuning assigned to control unit 11a.

Figure 5:
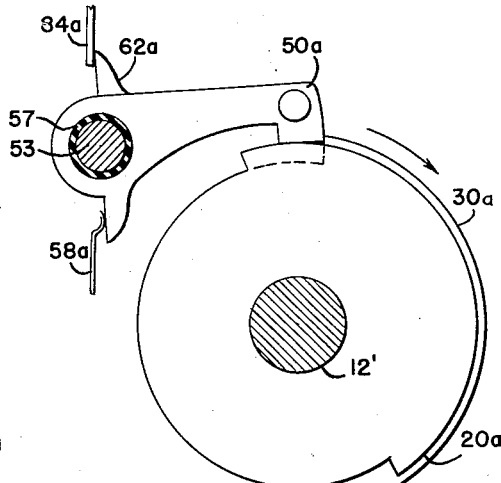

When tuning the controlled receiver from one station to another where those stations have closely related frequencies, it is possible to have the assembly of the slow member at its home position when selector magnet 80a is energized. For that case, brush 50a or brush 51a immediately engages cam sector 20a or cam sector 21a of the fast member as shown in Figs. 5 and 6, respectively. In that way an appropriate control circuit is completed to establish the correct direction of rotation for direct homing of the fast member and consequent displacement of the condenser rotor to that position assigned to control unit 11a.

Any of the remaining control units may accomplish preselected tuning of the controlled receiver by positioning the rotor of condenser 10 to an assigned position in a similar fashion. In general, it will be found that one of the brushes of the brush assembly will engage a cam sector of the slow member to complete a control circuit and determine the direction of rotation to effect direct homing of the slow member to its preselected angular position, namely, with its recess 38a aligned with the brush assembly. Thereafter, a brush engages a cam sector of the fast member, once again to determine the appropriate direction of rotation for driving the fast member directly to its home position wherein the brush assembly is received by the stop recess 27a to complete the tuning operation. The direction of rotation of the fast member, once the slow member has reached home position, may be the same as or opposite to the direction in which the slow member has been driven home, depending on whether the motor circuit is completed through the same or opposite brushes after the slow member is home.

The assignment of discrete tuning frequencies to the several control units is accomplished by operating the push button 81 for the particular control unit and allowing the mechanism to operate until the assemblies of the fast and slow members arrive at home position, as represented in Fig. 2. The assembly may then be held locked by pressing manual button 85. The set screw 25 of the particular control unit is accessible through an aligned aperture in structure 61 and may be released to permit shaft 12 to be rotated, preferably manually, until the desired station has been tuned in. Having thus determined the assigned position of the condenser, the set screw 25 is tightened, providing a driving connection from the assembly of the fast rotatable member of the particular control unit to the tuning condenser. Thereafter, whenever that given control unit is called upon, it always adjusts the condenser to the same assigned position.

It has been convenient, in the description and illustration, to consider the energizing circuit of motor 65 as completed through the shaft 12. If, for any reason, it is undesirable to have that shaft included in an electrical circuit, the rotatable members of the control assemblies may be insulated therefrom and a common connection from all of the cam sectors of any given unit may be had through the stationary member 40.

In Figs. 8 and 9 there is represented one control unit which may be thought of as a modification of the control unit 11a of Figs. 1 and 2. These units are the same in many respects and corresponding components are identified by the same reference characters. In the modification of Figs. 8 and 9, however, the construction permits the use of particularly appropriate materials for the brushes 50a and 51a and for the conductive cam sectors included in the assemblies of the fast and slow members without having to consider hardness, which is desired so far as the locking of the drive system is concerned. In this modification there is an auxiliary rotatable member 90a included in the assembly of the fast member for rotation therewith. This rotatable member has a stop recess 93a which is generally the same as, and in longitudinal alignment with, the recess 27a defined by the adjacent edges of cam sectors 20a and 21a of the fast member. A companion stop device 91a is included in the brush assembly, being positioned between brushes 50a and 51a and being insulated therefrom but movable therewith. A control unit of this construction accomplishes tuning in precisely the same way as described in connection with the arrangement of Figs. 1 and 2, but elements 90a and 91a, which may be formed of hardened steel, perform the locking function.

When the fast and slow members arrive at their home positions in the manner previously indicated, the stop element 91a included in the brush assembly registers with the stop recess 93a of the auxiliary member 90a to lock the driving system. This locking is shown in Fig. 9, indicating the relationship of the several parts when home positions are reached. It is apparent that, with the stop element 91a included in the brush assembly, the brushes hold the stop element out of engagement with its co-operating stop disc 90a until the brush assembly has cleared both cam sectors of the slow rotatable member. It is preferred that the stop projection 92a of stop element 91a be dimensioned to retain the brushes 50a and 51a out of engagement with all portions of the fast and slow members when the stop projection 92a has registered with the recess 93a of its stop disc 90a. Tapering the stop projection 92a permits the mechanism to pull into the final home position mechanically.

It is not necessary to have both of the sectors of the fast and slow members made of conductive material because a circuit arrangement may be employed which tends normally to establish one direction of rotation, subject to be reversed by the conjoint action of a sensing device or brush with one conductive cam sector included in the assembly of the slow member and another conductive sector included in the assembly of the fast member. Such a modification is represented structurally in Figs. 10 and 11. It is similar, in many respects, to the embodiment of Figs. 1 and 2 and corresponding components thereof are designated by similar reference characters.

In this case, however, sector 120a of the fast member is conductive, but the opposite sector 121a is made of insulating material. As to configuration, these sectors are identical with those in the embodiment of Fig. 1, having raised cam portions extending over an arc less than 180 degrees and arranged in image relation to define the stop recess 127a between the adjacent edges of the cam portions. In similar manner, sector 130a of the slow member is conductive while its companion sector 131a is an insulator and these are arranged in mirror image relation to define the stop recess 138a. The brush now comprises a single conductive member 150a which extends over the aligned sectors 120a, 121a, 130a, and 131a for selective engagement with any of them. A single conductive spring 158a engages a depending projection 160a of the brush for making a circuit connection thereto. The brush assembly again includes an insulating member 154a having a projection 162a to be engaged by the laminated spring 184a associated with the armature 182a of the selector magnet 180a. Otherwise, this arrangement is structurally substantially the same as that previously described and illustrated in Figs. 1 and 2.

An appropriate circuit arrangement for such a control unit is represented in Fig. 12. One terminal of the potential source is connected by a conductor 173 to the junction of a relay 190 and its armature 191. With the armature closed against a first contact 192, an energizing circuit for motor 65 may be completed through one-half of the split field winding 165', a conductor 176, a selector magnet 180a and a push button 181a, to the opposite terminal of the potential source. When the armature engages an alternate contact 193, the energizing circuit for the motor traverses the opposite path of the split field winding. An energizing circuit for relay 190 may be completed from a conductor 194 through the spring 158a, the brush 150a, and either conductive sector 120a or 130a to shaft 12 and back to the source 172. The broken construction line 179a indicates a mechanical connection from the armature of the selector magnet 180a to the brush 150a for moving the brush into engagement with the assemblies of both the slow and fast members.

In the operation of this embodiment, relay 190 is normally de-energized, presenting its armature 191 to contact 192. When push button 181a is depressed, selector magnet 180a is energized and the brush 150a is rotated in a clockwise direction. If the brush 150a engages cam sector 131a of the slow member, as represented in the explanatory diagram of Fig. 13, relay 190a remains de-energized and an energizing circuit for the driving motor is completed to establish a counter-clockwise direction of rotation. The counter-clockwise direction of rotation continues until the cam portion 131a is driven beyond the brush 150a as the slow member arrives at its home position. At that time, the brush rotates further in a clockwise direction and may engage the insulating sector 121a of the fast member as shown in Fig. 14 to continue the counter-clockwise direction until the assemblies of both the fast and slow members arrive at their home positions, as indicated in Fig. 11. With the rotatable assemblies in their home positions, the brush 150a, by engaging the recess 127a of the fast member assembly, interrupts the driving system and the tuning adjustment is complete.

Were the brush 150a to engage the alternate sector 130a of the slow member at the start of the tuning operation, a circuit to energize relay 190 is completed through spring 158a, brush 150a, cam sector 130a, and shaft 12. In response to the energization of relay 190, the armature 191 is displaced and brought into engagement with contact 193 to energize the motor from the opposite half of its split-phase winding and establish a clockwise direction of rotation. It is also apparent that where the brush 150a drops to engagement with the conductive sector 120a of the fast member upon arrival of the slow member to its home position, relay 190 is energized in a similar circuit completed through conductive sector 120a. This also establishes a clockwise direction of rotation to drive the fast member to its home position.

Still a further embodiment of the invention is represented in Figs. 15 and 16, featuring a structure which is functionally the same as that of Figs. 1 and 2 although different mechanically. Components of these figures, which are generally alike, have similar reference characters. In this modification, the slow member has but a single conductive cam sector 230a and there is only a single cam sector 220a, also conductive, in the assembly of the fast member. Concurrent rotation of these cam sectors at a desired speed ratio is achieved through the hypocycloid planetary gear system provided by the pinion gear 235a, meshing with internal gear 232a of the slow member 230a and with internal gear 245a of stationary member 240a.

The sensing means is modified to have a pair of diametrically opposed brushes 250a and 251a, positioned across from one another in the same plane in the control unit, as indicated in Fig. 15. These brushes are formed as bell cranks and pivot on rods 300 and 301, common to all control units where a plurality of the type under consideration are used. An insulating arm 302a, depending from brush 250a, engages an upright arm 303a of brush 251a so that the brushes are interlocked at adjacent ends for simultaneous movement in the same sense relative to the common axis of the fast and slow members. At the same time, the insulating arm 302a permits control circuits, completed by the engagement of the free ends of the brushes with the conductive cams 220a and 230a, to be electrically independent of one another. The control circuits are represented in Fig. 17, which is similar to the previously described circuit diagram of Fig. 7, corresponding components thereof being designated by similar reference characters. It is apparent that a first control circuit, to establish a clockwise direction of rotation, may be completed through one-half of the field winding 265', pivot rod 300, brush 250a, and either of cams 220a or 230a to shaft 12, assuming switches 306 and 307 to be closed. A circuit for establishing a counter-clockwise direction of rotation extends from the opposite half of winding 265', pivot rod 301, brush 251a, cam sector 220a or 230a to shaft 12. Since the control circuits include the pivot rods 300 and 301, it is preferable that they be insulated from the frame of the apparatus and from ground.

A leaf spring 309a, shown in Fig. 15, tends normally to bias brush 251a in a clockwise direction and tends, through the interlocking of the brushes, to bias brush 250a in the opposite sense. In that way, both brushes are held away from the fast and slow members until the associated selector magnet 280a is energized. The movement of these brushes is also relied upon to operate switches 306 and 307 to control the energizing circuit of the driving motor.

Switch 306 is normally open but may be closed by a bail 310 common to all control units and pivotally supported from the frame of the apparatus for displacement by the attraction of any armature 282 by its selector magnet 280. The other switch 307 is normally closed and is opened by a bail 311 likewise common to all control units. The bail 311 is pivotally supported by rod 300 to be operated by arm 302 when the control unit accomplishes a tuning function.

In the at rest condition, spring 309a holds brushes 250a and 251a from contact with either the fast or slow member. Also, arm 302 is drawn toward shaft 12, freeing bail 311 which rotates on pivot rod 300 and closes switch 307. Since no magnet 280 is energized, no armature 282 is attracted so bail 310 assumes a normal position out of contact with switch 306 which remains open. In operation, a selector magnet, such as magnet 280a, is energized to initiate a tuning sequence. With magnet 280a energized, its armature 282a is immediately drawn in and, in its movement, it displaces bail 310 to close normally open switch 306 and condition the motor control circuits for selective completion. The control circuit selected is determined by the orientation of cams 220a and 230a relative to the brushes 250a and 251a.

Assuming the orientation of explanatory Fig. 18, the energization of magnet 280a causes laminated spring 284a to engage projection 262a of the brush assembly and advance both brushes towards the fast and slow members, but this movement is interrupted as soon as brush 250a meets cam sector 230a. At that moment, both switches 306 and 307 are closed and a motor control circuit, initiating a clockwise direction of rotation, is completed from pivot rod 300, brush 250a, cam 230a of the slow member, and shaft 12'. No circuit is extended through the other brush 251a which is not in contact with any conductive cam sector, as indicated in Fig. 18.

The fast and slow members then rotate until the slow member arrives at home position in which it is out of contact with both brushes 250a and 251a. Laminated spring 284a is then able to advance both brushes toward the fast member. If this movement brings cam sector 220a into engagement with brush 251a, as indicated in Fig. 19, the circuit extending through pivot rod 301, brush 251a, cam 220a, and shaft 12' is set up and the direction of rotation reverses, becoming counter-clockwise. Continued rotation brings fast cam 220a to its home position, out of contact with both brushes. This permits laminated spring 284a to drive the brushes even closer to shaft 12' and drives bail 311 through arm 302a to open switch 307 and arrest the driving system. Fig. 15 indicates the arrangement at home position and demonstrates that the brushes have locked the cams in home position, the switch 307 is opened, and condenser 10 is in a preselected position.

Essentially the same sort of operating sequence follows whenever a selector magnet 280a is energized. Only one of the brushes 250 and 251 is in contact with a conductive cam during any operating interval because the brushes are diametrically opposed and the cams have an arc length less than 180 degrees. Any circuit closed through brush 250 results in a clockwise direction of rotation, while any circuit established through brush 251 produces a counter-clockwise direction of rotation. At the completion of any tuning operation when the push button 281 is released, the chosen selector magnet 280 is de-energized and releases its armature 282. This enables bail 310 to return to its normal position and open switch 306. It also permits spring 309 to restore brushes 250 and 251 to a position in which they are away and out of all contact with conductive cams 220 and 230. Simultaneously, arm 302 releases bail 311 which falls away from and closes switch 307. This completes resetting of the apparatus.

The modification of Figs. 15 and 16, as described, may be arranged for separation of the locking and sensing functions by providing separate hardened mechanical locking elements similar to those of Figs. 8 and 9. This may be done by adding an auxiliary fast member as 90a having a stop recess and a co-operating stop device as 91a for registering with that recess positively to lock the control unit against further operation after the assemblies of the fast and slow members have been driven to home position. Such elements may also be added advantageously to the embodiment of Figs. 10 and 11.

Instead of having the brushes out of engagement with the cam sectors of the control unit until the selector magnet of that unit is energized, as in all of the described arrangements, the brushes may be biased normally to engage the cams. Then any kind of push button, switch, or the like may be arranged to complete the electrical circuits of the brushes and cam sectors of any control unit only when that unit is accomplishing tuning.

By way of illustration, Figs. 20 and 21 represent a control unit in which the sensing brushes are continuously biased into engagement with the fast and slow members. In that embodiment an insulating sleeve 350 insulates the assemblies of the fast and slow members from the shaft 12. The fast member includes a conductive sector 351 of slightly less than 180 degrees arc length which is riveted or otherwise connected to a hub 352. Intermediate the fast sector 351 and a flange of the hub 352 are located two similar sectors 353 and 354 constituting the slow member. Of these, sector 353 is conductive while sector 354 is constructed of insulating material. Sectors 353 and 354 have arc lengths less than 180 degrees and are mounted in image relation, as shown in Fig. 21, to define the recesses 355 and 356. Preferably, the low portion 354' of the insulating sector has a greater radius than the corresponding portions of conductive sectors 351 and 353 so that the brushes 360 and 361 rest on insulation when the fast and slow members are in home position, indicated in Fig. 21. A conductive stationary member 357 is also positioned between elements 351 and 352 of the fast member. A bifurcated projection 358 engages a rod 359 to keep member 357 fixed.

As in the other modifications, internal gears provided in sectors 353 and 354 of the slow member as well as in stationary member 357 co-operate with a pinion gear 362 rotatably supported in the fast-member assembly to define a planetary gear system for concurrently rotating the fast and slow member assemblies at a desired speed ratio. The driving motor and gear train connected to shaft 12 have been omitted from the drawings for simplicity but they may be of the type shown in any of the other embodiments.

The brushes 360 and 361 are conductive and resilient. They are anchored to the frame as indicated at 363 and 364 and are biased toward the center of shaft 12.

A suitable control circuit is represented in Fig. 22 wherein the inductor-condenser combination 370 denotes a split-phase capacitor motor. One terminal of a potential source 371 is connected to the mid-point of the motor winding and its other terminal is connected to a movable switch arm 372 of a remotely controlled switch. This arm may selectively engage any of contacts 373a, 373b and 373c, assuming the control system to have three units each like that shown in Figs. 20 and 21. Each contact 373 is connected to the projection 358 of the stationary conductive member 357 of one control unit. From the stationary member 357 a circuit for establishing a clockwise direction of rotation may be extended through either conductive sector 351 or 353, brush 360 and one side of the motor winding to source 371. Alternatively, an exciting circuit to establish a counter-clockwise direction of rotation may be completed from either of sectors 351 or 353, through brush 361 and the other side of the motor winding to source 371.

The operation of this embodiment will be apparent from the foregoing. It will be seen that only one control unit is rendered effective at any time in accordance with the position of switch arm 372. The brushes of the selected control unit determine the appropriate direction of rotation to effect direct homing of first the slow and then the fast member assembly. In that manner, the controlled element is driven to a preselected position assigned to the particular control unit. When both the slow and fast members reach home position, as shown in Fig. 21, brushes 360 and 361 rest on the portion 354' of the insulated element 354 and the motor circuit is interrupted.

Another control circuit is represented in Fig. 23, denoting within broken-line rectangle 380 a shaded-pole motor having a winding connected to source 371. Two shading windings 381 and 382 permit a control of the direction of rotation. Push buttons 383a, 383b and 383c enable the control units to be selectively actuated. When any push button is depressed, a circuit may be extended through brush 360 and shading winding 381 resulting in a clockwise direction of rotation or through brush 361 and the other shading winding 382 for counter-clockwise rotation. This arrangement operates essentially the same as that of Fig. 22 but has the advantage that the brushes carry only the shading currents rather than the whole current of the driving motor.

All forms of the invention illustrated and described position a rotary controlled element to a preselected angular position. In each form there is a positive control of the motor to effect direct homing regardless of the starting conditions. The motor always starts and drives the rotatable members directly to home position in the proper direction, whether the rotation required be many revolutions or only a small fraction of a revolution of the fast-member assembly. The proper sequence of operation always obtains without the necessity of including a separate sequence control arrangement in the control unit.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for positioning a rotary controlled element in a predetermined angular position comprising: a fast member rotatable within a multi-revolution range, including at least one conductive sector less than 180 degrees; a slow rotatable member including at least one conductive sector less than 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; and means for providing a driving connection from one of said rotatable members to said controlled element.

2. Apparatus for positioning a rotary controlled element in a predetermined angular position comprising: a fast member rotatable within a multi-revolution range, including at least one conductive sector less than 180 degrees; a slow rotatable member in coaxial alignment with said fast member and including at least one conductive sector less than 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; and means for providing a driving connection from one of said rotatable members to said controlled element.

3. Apparatus for positioning a rotary controlled element in a predetermined angular position comprising: a fast member rotatable within a multi-revolution range, including at least one conductive sector less than 180 degrees; a slow rotatable member in coaxial alignment with said fast member and including at least one conductive sector less than 180 degrees which has a radius exceeding that of said fast member; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; and means for providing a driving connection from one of said rotatable members to said controlled element.

4. Apparatus for positioning a rotary controlled element in a predetermined angular position comprising: a fast member rotatable within a multi-revolution range, including at least one conductive sector less than 180 degrees; a slow rotatable member including at least one conductive sector less than 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of said system to effect direct homing of first said slow member to its preselected angular position and then said fast member to a preselected angular position related to said predetermined position of said controlled element; and means for providing a driving connection from said fast member to said controlled element.

5. Apparatus for positioning a rotary controlled element in a predetermined angular position comprising: a fast member rotatable within a multi-revolution range, including a pair of conductive sectors individually less than 180 degrees and separated by a stop recess; a slow rotatable member including a pair of conductive sectors individually less than 180 degrees and separated by a stop recess; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; and means for providing a driving connection from one of said rotatable members to said controlled element.

6. Apparatus for positioning a rotary controlled element in a predetermined angular position comprising: a fast member rotatable within a multi-revolution range, including a pair of conductive sectors individually less than 180 degrees and separated by a stop recess; a slow rotatable member including a pair of conductive sectors individually less than 180 degrees and separated by a stop recess; conductive sensing means for engaging said slow member and movable, when said slow member is in a preselected angular position, into engagement with said fast member, said sensing means including one brush for registering with one sector of each of said slow and fast members and another brush for registering with the other sector of each of said members; an electrical reversible system for driving said members at a preselected speed ratio; control circuits for determining the direction of rotation of said system to effect direct homing of first said slow member to its preselected angular position and then said fast member to a preselected angular position related to said predetermined position of said controlled element, one of said control circuits comprising conductors connecting said one brush and said conductive sectors associated therewith into said electrical system to establish one direction of rotation and another of said control circuits comprising conductors connecting said other brush and said conductive sectors associated therewith into said electrical system to establish the opposite direction of rotation; and means for providing a driving connection from one of said rotatable members to said controlled element.

7. Apparatus for positioning a rotary controlled element in a predetermined angular position comprising: a fast member rotatable within a multi-revolution range, including a pair of conductive sectors effectively positioned in mirror image relation, individually less than 180 degrees and separated by a stop recess; a slow rotatable member including a pair of conductive sectors effectively positioned in mirror image relation, individually less than 180 degrees and separated by a stop recess; conductive sensing means for engaging said slow member and movable, when said slow member is in a preselected angular position, into engagement with said fast member, said sensing means including one brush for registering with one sector of each of said slow and fast members and another brush for registering with the other sector of each of said members; an electrical reversible system for driving said members at a preselected speed ratio; control circuits for determining the direction of rotation of said system to effect direct homing of first said slow member to its preselected angular position and then said fast member to a preselected angular position related to said predetermined position of said controlled element, one of said control circuits comprising conductors connecting said one brush and said conductive sectors associated therewith into said electrical system to establish one direction of rotation and another of said control circuits comprising conductors connecting said other brush and said conductive sectors associated therewith into said electrical system to establish the opposite direction of rotation; and means for providing a driving connection from one of said rotatable members to said controlled element.

8. Apparatus for positioning a rotary controlled element in a predetermined angular position comprising: a fast member rotatable within a multi-revolution range, including a pair of conductive sectors individually less than 180 degrees and separated by a stop recess; a slow rotatable member including a pair of conductive sectors individually less than 180 degrees and separated by a stop recess; conductive sensing means for engaging said slow member and movable, when said slow member is in a preselected angular position, into engagement with said fast member to register with said stop recess thereof and arrest further rotation when said fast member is in a preselected angular position; an electrical reversible system for driving said members at a preselected speed ratio; control circuits included in said electrical system comprising said sensing means and said conductive sectors of said rotatable members for determining the direction of rotation of said system to effect direct homing of first said slow member and then said fast member to their respective preselected angular positions; and means for providing a driving connection from one of said rotatable members to said controlled element.

9. Apparatus for positioning a rotary controlled element in a predetermined angular position comprising: a fast member rotatable within a multi-revolution range and including a conductive sector less than 180 degrees; a slow rotatable member including a conductive sector less than 180 degrees; conductive sensing means, including a pair of diametrically opposed brushes, for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; and means for providing a driving connection from one of said rotatable members to said controlled element.

10. Apparatus for positioning a rotary controlled element in a predetermined angular position comprising: a fast member rotatable within a multi-revolution range and including a conductive sector less than 180 degrees; a slow rotatable member in coaxial alignment with said fast member and including a conductive sector less than 180 degrees; conductive sensing means, including a pair of diametrically opposed brushes simultaneously movable in the same sense relative to the axis of said members, for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; and means for providing a driving connection from one of said rotatable members to said controlled element.

11. Apparatus for positioning a rotary controlled element in a predetermined angular position comprising: a fast member rotatable within a multi-revolution range and including a conductive sector less than 180 degrees; a slow rotatable member in coaxial alignment with said fast member and including a conductive sector less than 180 degrees; conductive sensing means, including a pair of diametrically opposed brushes mechanically interlocked to be simultaneously movable in the same sense relative to the axis of said members, for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; and means for providing a driving connection from one of said rotatable members to said controlled element.

12. Apparatus for positioning a rotary controlled element in a predetermined angular position comprising: a fast member rotatable within a multi-revolution range and including a conductive sector less than 180 degrees; a slow rotatable member in coaxial alignment with said fast member and including a conductive sector less than 180 degrees; a pair of opposed, pivoted conductive bell cranks interlocked but insulated at adjacent ends for simultaneous movement in the same sense relative to the axis of said members and having opposed ends for engaging said slow member and movable, when said slow member is in a preselected angular position, into engagement with said fast member; an electrical reversible system for driving said members at a preselected speed ratio; control circuits included in said electrical system comprising said bell cranks and said conductive sectors of said rotatable members for determining the direction of rotation of said system to effect direct homing of first said slow member to its preselected angular position and then said fast member to a preselected angular position related to said predetermined position of said controlled element; and means for providing a driving connecton from one of said rotatable members to said controlled element.

13. Apparatus for positioning a rotary controlled element in a predetermined angular position comprising: a fast member rotatable within a multi-revolution range and including a conductive sector less than 180 degrees; a slow rotatable member in coaxial alignment with said fast member and including a conductive sector less than 180 degrees; conductive sensing means, including a pair of diametrically opposed brushes, for engaging said slow member and movable, when said slow member is in a preselected angular position, into engagement with said fast member; an electrical reversible system for driving said members at a preselected speed ratio; control circuits for determining the direction of rotation of said system to effect direct homing of first said slow member to its preselected angular position and then said fast member to a preselected angular position related to said predetermined position of said controlled element, one of said control circuits comprising one of said brushes and said conductive sectors for establishing one direction of rotation and another of said control circuits comprising the other of said brushes and said conductive sectors for establishing the opposite direction of rotation; and means for providing a driving connection from one of said rotatable members to said controlled element.

14. Apparatus for positioning a rotary controlled element in a predetermined angular position comprising: a fast member rotatable within a multi-revolution range, including at least one conductive sector less than 180 degrees; a slow rotatable member including at least one conductive sector less than 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; a normally closed switch included in said electrical system; means responsive to the homing of said fast member to its preselected angular position for opening said switch to de-energize said system; and means for providing a driving connection from one of said rotatable members to said controlled element.

15. Apparatus for positioning a rotary controlled element in a predetermined angular position comprising: a fast member rotatable within a multi-revolution range, including a pair of conductive sectors effectively positioned in mirror image relation, individually less than 180 degrees and separated by a stop recess; a slow rotatable member including a pair of conductive sectors effectively positioned in mirror image relation, individually less than 180 degrees and separated by a stop recess; conductive sensing means for engaging said slow member and movable, when said slow member is in a preselected angular position, into engagement with said fast member, said sensing means including one brush for registering with one sector of each of said slow and fast members and another aligned and simultaneously movable brush for registering with the other sector of each of said members; an electrical reversible system for driving said members at a preselected speed ratio; control circuits for determining the direction of rotation of said system to effect direct homing of first said slow member to its preselected angular position and then said fast member to a preselected angular position related to said predetermined position of said controlled element, one of said control circuits comprising conductors connecting said one brush and said conductive sectors associated therewith into said electrical system to establish one direction of rotation and another of said control circuits comprising conductors connecting said other brush and said conductive sectors associated therewith into said electrical system to establish the opposite direction of rotation; and means for providing a driving connection from one of said rotatable members to said controlled element.

16. Apparatus for positioning a rotary controlled element in a predetermined angular position comprising: a fast member rotatable within a multi-revolution range and a slow rotatable member, each of said members including two sectors individually less than 180 degrees and separated by a stop recess, one sector of each member being conductive and the other being non-conductive; conductive sensing means for engaging said slow member and movable, when said slow member is in a preselected angular position, into engagement with said fast member; an electrical reversible system for driving said members at a preselected speed ratio; a first control circuit completed when said sensing means engages one of said non-conductive sectors, for establishing one direction of rotation and a second control circuit completed when said sensing means engages one of said conductive sectors for establishing an opposite direction of rotation for conjointly effecting direct homing of first said slow member to its preselected angular position and then said fast member to a preselected angular position related to said predetermined position of said controlled element; and means for providing a driving connection from one of said members to said controlled element.

17. Apparatus for positioning a rotary controlled element in a predetermined angular position comprising: a fast member rotatable within a multi-revolution range and a slow rotatable member, each of said members including a conductive sector less than 180 degrees; conductive sensing means for engaging said slow member and movable, when said slow member is in a preselected angular position, into engagement with said fast member; an electrical reversible system for driving said members at a preselected speed ratio; a first control circuit normally establishing one direction of rotation and a second control circuit completed when said sensing means engages one of said conductive sectors for establishing an opposite direction of rotation for conjointly effecting direct homing of first said slow member to its preselected angular position and then said fast member to a preselected angular position related to said predetermined position of said controlled element; and means for providing a driving connection from one of said members to said controlled element.

18. Apparatus for positioning a rotary controlled element in a predetermined angular position comprising: a fast member rotatable within a multi-revolution range and a slow rotatable member, each of said members including a conductive sector less than 180 degrees; conductive sensing means for engaging said slow member and movable, when said slow member is in a preselected angular position, into engagement with said fast member; an electrical reversible system for driving said members at a preselected speed ratio; a relay included in said electrical system; a first control circuit for operating said relay in one sense to establish one direction of rotation and a second control circuit completed when said sensing means engages one of said conductive sectors for operating said relay in the opposite sense to establish an opposite direction of rotation for conjointly effecting direct homing of first said slow member to its preselected angular position and then said fast member to a preselected angular position related to said predetermined position of said controlled element; and means for providing a driving connection from one of said members to said controlled element.

19. Apparatus for positioning a rotary controlled element in a predetermined angular position comprising: a fast member rotatable within a multi-revolution range and a coaxial slow rotatable member, each of said members including two sectors individually less than 180 degrees and separated by a stop recess, one sector of each member being conductive and the other being non-conductive; a conductive brush for engaging said slow member and movable, when said slow member is in a preselected angular position, into engagement with said fast member; an electrical reversible system for driving said members at a preselected speed ratio; a first control circuit completed when said brush engages one of said non-conductive sectors for establishing one direction of rotation and a second control circuit completed when said brush engages one of said conductive sectors for establishing an opposite direction of rotation for conjointly effecting direct homing of first said slow member to its preselected angular position and then said fast member to a preselected angular position related to said predetermined position of said controlled element; and means for providing a driving connection from one of said members to said controlled element.

20. Apparatus for positioning a rotary controlled element in a predetermined angular position comprising: a fast member rotatable within a multi-revolution range, including at least one conductive sector less than 180 degrees, and having a stop recess adjacent one end of said sector; a slow rotatable member including at least one conductive sector less than 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; a stop device movable, when said fast member is in its preselected angular position, into registration with said stop recess of said fast member to arrest further rotation thereof; and means for providing a driving connection from one of said rotatable members to said controlled element.

21. Apparatus for positioning a rotary controlled element in a predetermined angular position comprising: a fast member rotatable within a multi-revolution range, including at least one conductive sector less than 180 degrees, and having a stop recess adjacent one end of said sector; a slow rotatable member including at least one conductive sector less than 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; a stop device movable with said sensing means for registering with said stop recess of said fast member, when said member is in its preselected angular position, to arrest further rotation thereof; and means for providing a driving connection from one of said rotatable members to said controlled element.

22. Apparatus for positioning a rotary controlled element in a predetermined angular position comprising: a fast member rotatable within a multi-revolution range, including at least one conductive sector less than 180 degrees and including an auxiliary rotatable member having a stop recess; a slow rotatable member including at least one conductive sector less than 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element; a stop device movable, when said fast member is in its preselected angular position, into registration with said stop recess of said auxiliary member to arrest further rotation thereof; and means for providing a driving connection from one of said rotatable members to said controlled element.

23. Apparatus for positioning a rotary controlled element in a predetermined angular position comprising: at least one rotatable member including at least one sector of relatively soft high-conductivity material and an auxiliary element of wear-resistant material having mechanical stop provisions; a latch assembly riding on said member including an element of relatively soft high-conductivity material adapted to engage said sector and an auxiliary mechanical stop device of wear-resistant material for registering with said stop provisions to arrest rotation of said member when said member is in a preselected angular position related to said predetermined position of said controlled element; an electrical reversible system for concurrently driving said member and said controlled element; and control circuits included in said electrical system, comprising said conductive sector and said conductive element, for determining the direction of rotation of said system to effect direct homing of said member to its preselected angular position.

24. Apparatus for positioning a rotary controlled element in a predetermined angular position comprising: at least one rotatable member including at least one sector of relatively soft high-conductivity material and an auxiliary element of wear-resistant material having mechanical stop provisions; a latch assembly riding on said member including an element of relatively soft high-conductivity material adapted to engage said sector and an auxiliary mechanical stop device of wear-resistant material for registering with said stop provisions to arrest rotation of said member when said member is in a preselected angular position related to said predetermined position of said controlled element; an electrical reversible system for concurrently driving said member and said controlled element; and control circuits included in said electrical system, comprising said conductive sector and said conductive element, for determining the direction of rotation of said system to effect direct homing of said member to its preselected angular position the elements of said rotatable member and said latch assembly being so dimensioned that said stop provisions and said stop device hold said conductive sector and conductive element out of engagement when said member is in said preselected position.

25. Apparatus for positioning a rotary controlled element in a predetermined angular position comprising: at least one rotatable member including two sectors of relatively soft high-conductivity material individually less than 180 degrees and an auxiliary element of wear-resistant material having mechanical stop provisions; a latch assembly riding on said member including an element of relatively soft high-conductivity material adapted to engage said sectors and an auxiliary mechanical stop device of wear-resistant material for registering with said stop provisions to arrest rotation of said member when said member is in a preselected angular position related to said predetermined position of said controlled element; an electrical reversible system for concurrently driving said member and said controlled element; and a first control circuit comprising said conductive element and one of said sectors and a second control circuit comprising said conductive element and the other of said sectors for conjointly determining the direction of rotation of said system to effect direct homing of said member to its preselected angular position.

26. Apparatus for positioning a rotary controlled element in a predetermined angular position comprising: at least one rotatable member including at least one sector of relatively soft high-conductivity material and an auxiliary element of wear-resistant material having mechanical stop provisions; a latch assembly riding on said member including an element of relatively soft high-conductivity material adapted to engage said sector and an auxiliary mechanical stop device of wear-resistant material for registering with said stop provisions to arrest rotation of said member when said member is in a preselected angular position related to said predetermined position of said controlled element; an electrical reversible system for concurrently driving said member and said controlled element; and control circuits included in said electrical system, comprising said conductive sector and said conductive element, for determining the direction of rotation of said system to effect direct homing of said member to its preselected angular position, the elements of said rotatable member and said latch assembly being so dimensioned that said conductive sector and said conductive element hold said auxiliary element and said stop device out of engagement except when said member is in said preselected position.

27. Apparatus for positioning a rotary controlled element in a predetermined angular position comprising: a fast member rotatable within a multi-revolution range, including at least one conductive sector of approximately 180 degrees; a slow rotatable member including at least one conductive sector of approximately 180 degrees; conductive sensing means for engaging said slow member and movable, when said slow member is in a preselected angular position, into engagement with said fast member; an electrical reversible system for driving said members at a preselected speed ratio; control circuits included in said electrical system comprising said sensing means and said conductive sectors of said rotatable members for determining the direction of rotation of said system to effect direct homing of first said slow member to its preselected angular position and then said fast member to a preselected angular position related to said predetermined position of said controlled element, and means for providing a driving connection from one of said rotatable members to said controlled element.

HAROLD F. ELLIOTT.

REFERENCES CITED

The following references are of record in the file of this patent:

UNITED STATES PATENTS

| Number | Name | Date |
|---|---|---|
| 1,795,420 | Beall | Mar. 10, 1931 |
| 1,956,419 | Garrett | Apr. 24, 1934 |
| 2,114,068 | Plensler | Apr. 12, 1938 |
| 2,208,549 | Plensler | July 16, 1940 |
| 2,389,350 | Exner | Nov. 20, 1945 |
| 2,263,989 | Hill et al. | Nov. 25, 1951 |